United States Patent [19]

Sedlmair

[11] Patent Number: 5,042,829
[45] Date of Patent: Aug. 27, 1991

[54] SCREW HOLDING DEVICE

[75] Inventor: Gerhard Sedlmair, Farchant, Fed. Rep. of Germany

[73] Assignee: Marker Deutschland GmbH, Fed. Rep. of Germany

[21] Appl. No.: 469,191

[22] Filed: Jan. 24, 1990

[30] Foreign Application Priority Data

Jan. 24, 1989 [DE] Fed. Rep. of Germany ... 8900755[U]

[51] Int. Cl.$^5$ .......................... A63C 9/00; F16B 39/00
[52] U.S. Cl. .................................... 280/633; 280/611; 280/636
[58] Field of Search ............... 280/611, 633, 634, 636, 280/618, 617, 607

[56] References Cited

U.S. PATENT DOCUMENTS

| | | | |
|---|---|---|---|
| 4,154,460 | 5/1979 | Weigl | 280/611 |
| 4,158,377 | 6/1979 | Beyl | 280/611 |
| 4,640,524 | 2/1987 | Sedlmair | 280/611 |

Primary Examiner—David M. Mitchell
Attorney, Agent, or Firm—D. Peter Hochberg; Mark Kusner; Louis J. Weisz

[57] ABSTRACT

A screw holding device in which a screw retaining housing is positioned over a base member to which one end of the housing is attached by means of a break-away connection. The top of the housing member has a slot therein extending from the open end of the housing and overlying a corresponding slot in the base member. The device can be used in conjunction with an associated part by inserting screws in holes provided in the part, and sliding the part into the space between the base and the cantilevered housing, the housing admitting the head of the screw, and the base slot its shank. When so positioned, the screw can be driven into still another component by a screwdriver inserted through the slot in the housing top, thereby fastening the base and the part to the component. Thereafter, the housing can be broken off by a force acting on the break-away connection, leaving the space over the base unrestricted.

11 Claims, 1 Drawing Sheet

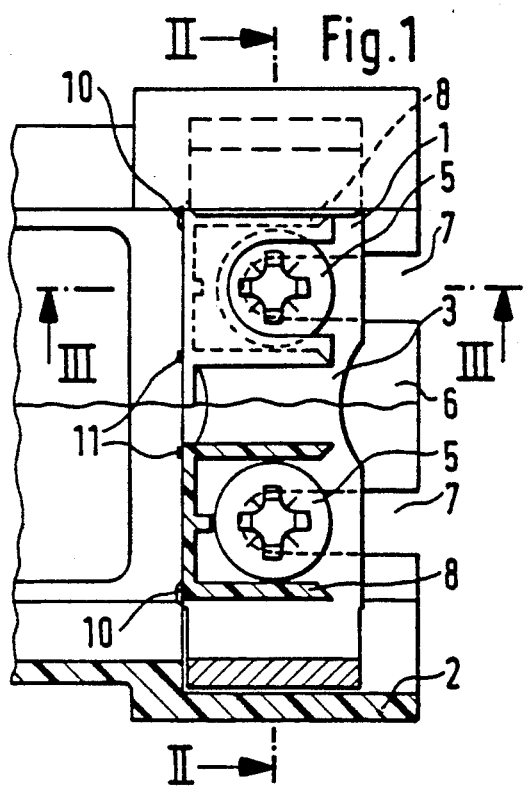
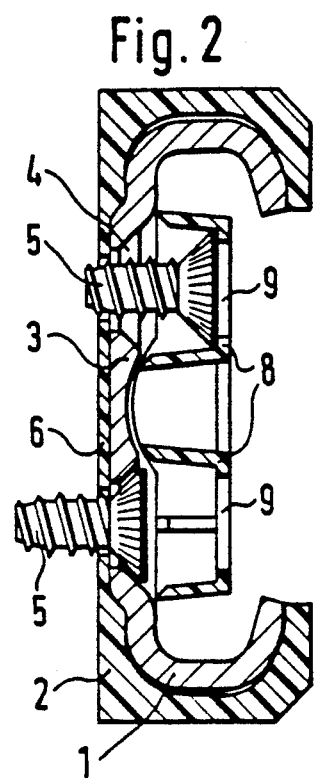
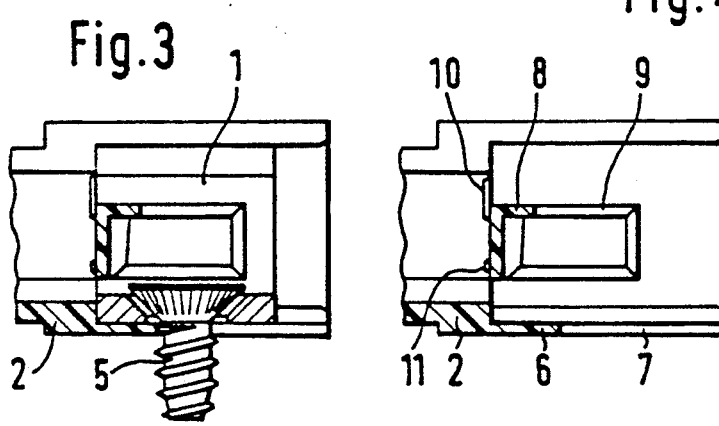
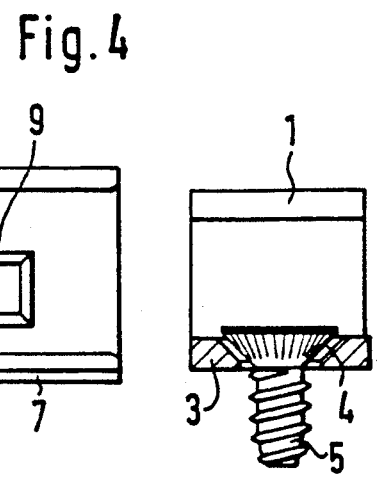

SCREW HOLDING DEVICE

TECHNICAL FIELD

This invention relates to a device for holding fasteners, particularly screws, prior to their engagement in parts to be held thereby. More particularly, this invention relates to a screw holding device that retains screws in a position adjacent to their position of use, prior to their engagement. Specifically, this invention relates to a device that positions screws relative to their location of use in components of a ski binding to be attached to a ski, and prevents their accidental removal therefrom, prior to their being engaged in the ski.

BACKGROUND OF THE INVENTION

In fabricating assemblies to be held together with fasteners such as screws, it is convenient to pre-position the screws adjacent to the parts to be fastened, so that the screws can be readily engaged at an appropriate time. However, in some instances when pre-positioning is attempted, the screws thus positioned fall out of their location, with the result that they become lost or otherwise cause inconvenience. This, for example, occurs when ski bindings are to be screwed to a ski.

In the past, various screw holding devices have been devised, including that described in Germany Utility Model Specification 8410539, which was designed for positioning screws employed in the applications described therein. The device there taught consists of a screw locating part provided with a hole for receiving the head of a screw. The device has tongue-like, resilient projections whose free ends define an imaginary circle having a diameter somewhat smaller than the head of the screw to be employed, allowing the latter to be held by the projections when screw is inserted in the hole. However, use of the device requires a particular positioning wherein one part is to be placed on top of the component to which it is to be attached, greatly limiting its usefulness.

BRIEF DESCRIPTION OF THE INVENTION

It is a first aspect of this invention, therefore, to provide a screw holding device for retaining screws in association with the parts to be fastened therewith.

It is a second aspect of this invention to provide a screw holding device associated with the part to be fastened which prevents the screw from becoming inadvertently dislodged from the device, and thus being separated from the part.

A further aspect of this invention is to furnish a screw holding device that can be used with a part that has further part associated therewith on the side of the first mentioned part facing the component to be screw-attached.

An additional aspect of this invention is to provide a screw holding device that permits entry of a screwdrivers, tip, allowing the screw to be driven into its position of use.

Yet another aspect of this device is to furnish a screw holding device that can be "broken-away" from its point of attachment to a part to be fastened after the screws held in the device have been driven.

An additional aspect of this invention is to provide a screw holding device that forms an integral, but detachable element of the part with which it is associated.

A more particular object of the invention is to provide a device for holding screws in a retaining member to be attached to a component of a ski binding, the latter two parts to be attached to a ski.

The invention in its preferred form as applied to ski bindings, includes a retaining or component part (for retaining a base plate) or first member with a hole for receiving a screw, and an additional part (for guiding the base plate) or second or base member having a slot into which the screw partially inserted in the retaining part can be moved sideways and a cantilever device over the screw receiving area of the additional part for retaining the screw and having screw driver access opening for driving the screw. The cantilever device can be broken off once the screw is screwed in place.

BRIEF DESCRIPTION OF THE DRAWINGS

The preferred form of the invention will be better understood when reference is had to the following figures, in which like numbers refer to like parts, and in which:

FIG. 1 is a partially sectioned, top plan view showing the screw holding device of the preferred form of the invention, and an associated part, with screws therein ready for mounting.

FIG. 2 is a sectional view along line II—II of FIG. 1.

FIG. 3 is a sectional view along line III—III of FIG. 1.

FIG. 4 is a sectional view similar to that of FIG. 3, but showing the screw holding device of the invention and its associated part, sparately.

DETAILED DESCRIPTION OF THE INVENTION

FIG. 1 is a top plan section view illustrating the screw holding device of the invention, together with a part associated therewith, as used in a ski binding to be attached to a ski. The part 1 associated with the screw holding device is shown, together with the device itself comprising a base member 2, over which screw holding housings 8 are cantilevered. The associated part 1 has screw holes located therein which accommodate screws 5. Following placement of the screws in part 1, and after insertion of the shank of the screws in base member slots 7, the associated part is moved forward until the heads of the screws pass through the open end of the screw holding housings 8 and abut their closed end. When enclosed in the housings, the screws are securely retained therein, but are accessible to being driven by a screwdriver, as is more clearly explained in connection with FIG. 2.

The associated part 1 may be a U-shaped retaining member for retaining the base plate (not shown) of a ski binding. In such case, the U-shaped retaining member provides a bearing surface for the ski base plate, allowing it to slide therealong. When thus configured, the base member 2 extends beyond the U-shaped retaining member, acting as a guiding "rail" for the base plate. While such use is a particularly preferred embodiment of the invention, the screw holding device of the invention is adapted to other applications apart from its use in connection with ski binding. In addition, while the invention is particularly suited for employment in connection with an associated part 1, it need not be used with such a part. When the invention is employed in conjunction with ski bindings, however, the screws 5 are designed to hold the associated part 1, and the base member 2 firmly to a ski.

The cantilevered housings 8 are attached to the base member of the screw holding device by means of "break-away" connections 10 and 11. The break-away portions serve the function of allowing the housings to be broken away for disposal after the screws have been driven into their fastening mode.

FIG. 2 is a sectional view along line II—II of FIG. 1. The Figure provides a particularly clear view of the relationships and functioning of the components of the invention. As shown, a base member 2 partially surrounds the associated part 1, both members being then attached to a third component (not shown), such as a ski, by means of screws 5. In the Figure, screws 5 extend through holes 4 in the crosspiece 3 of associated part 1, and into corresponding slots in crosspiece 6 of the base member. In the illustration, the holes 4 are tapered to accommodate the shape of the flat-head screws illustrated. As can be seen, screws 5 are retained in the screw holding housings 8, but access to the heads of the screws by a screwdriver is provided through the housing slots 9.

In connection with the cantilevered housings 8, it has been found desirable to employ a "pot-like" shape for the housings, i.e., a shape in which the walls of the housing disposed at right angles to the housings open end are convergent in the direction of their juncture with the "top" or cantilever of the housing, that is the surface in which the slots 9 are disposed. When so shaped, as the screw is moved back into the housing in preparation for mounting, for example on a ski, the shape serves to guide the screw as it is pushed back into the housing, as is shown in the case of the upper one of the screws of FIG. 2.

If desired, and to conserve material employed in fabricating the housing, the housing structure may be fabricated in the form of a perforate mesh. Base member 2 and cantilevered housing 8 are preferably integral parts of a plastic compound.

FIG. 3 is a sectional view along line III—III of FIG. 1. As illustrated, the associated part 1 has been inserted into the base member, as is better seen in connection with FIG. 2, and a screw 5 is located in its driven position. While other screws may be employed, the screws contemplated in the Figures are of the conventional sheet metal type, which tap mating screw threads in pre-drilled holes.

When the screw holding device of the invention is used in connection with ski bindings, it has been found desirable to construct the base member 2 from plastic as noted above so that the housings may be readily removed at their break-away connections with the base member. Associated member 1 is ordinarily formed from sheet metal.

FIG. 4 is a sectional view similar to that of FIG. 53 in which, however, the base member and the part associated therewith are shown in a disassembled position. In the part of the Figure illustrating the base member 2, the housing 8 is shown cantilevered over the base member, and connected thereto by means of break-away connections 10 and 11. The Figure also shows housing opening 9 overlying the corresponding base member slot 7, disposed in the crosspiece portion 6 of the base member.

In the portion of the Figure representing the assoicated part 1, the screw 5 is shown located in crosspiece 3. As previously indicated, the hole through the crosspiece is desirably provided with a tapered edge to accommodate the corresponding taper of the screw head.

As is clear from the Figures, particularly FIG. 2, the screws are retained in the housing by the top thereof, preventing accidental dislodgement from their location of use.

After the screws have been screwed into predrilled holes, for instance, into such holes provided in skis, the housing may be broken off by exerting a force thereagainst. In the case of skis, this may be when the base plate of the ski binding is inserted into the U-shaped associated part 1. When thus broken off, the base plate is free to move in the ski binding without undue restriction. The break-away portions may be fabricated in ways well known in the art to be detachable through application of a force of a desired magnitude.

In use, screws 5 are partially driven into holes 4 of U-shaped part 1. Part 1 is then moved towards base member 2 so that screws 5 slide into slots 7. When screws 5 abut the ends of slot 7, and the partially assembled component is placed on a ski, a screw driver can be inserted into housing openings 9 to drive screws 5 into their pre-drilled holes. Housings 8 can then be discarded after breaking their connections 10 and 11.

While in accordance with the patent statutes, a preferred embodiment and best mode has been presented, the scope of the invention is not limited thereto, but rather as measured by the scope of the attached claims.

What is claimed is:

1. A screw holding device comprising:
   a base member having a slot for receiving the shank of a screw having a head, the slot being dimensioned to prevent the head from passing therethrough; and
   a screw holding housing operatively connected to said base member and having a cantilever extending over the slot in said base member for obstructing the path of movement upward towards the cantilever of a screw head of a screw in the slot of said base member, said cantilever having an opening opposite said slot in said base member for receving a screw driver for turning the head of the screw in said slot;
   whereby an associated member having the foregoing screw extending through the associated member can be moved relative to said base member so that the screw is positioned transverse to and through said slot in said base member and beneath the opening in said cantilever, with the shank of the screw extending through said slot with the head of the screw being confined between said cantilever and said base member.

2. A device according to claim 1 wherein the opening in said cantilever is a slot extending opposite said slot in said base member and having a width insufficient to pass the head of the screw in the associated part therethrough, but said width being sufficient for a screwdriver inserted through the slot in said cantilever to operatively engage said head.

3. A device according to claim 2 wherein said base member has a second slot, parallel to said slot in said base member, for receiving the shank of a second screw having a head the second slot being dimensioned to prevent the head of the second screw from passing therethrough; and
   wherein said cantilever has a slot, parallel to the slot in said cantilever, extending opposite said second slot in said base member and having a width insufficient to pass the head of the second screw in the associated part therethrough, and said width being sufficient for a screwdriver inserted through the second slot in said cantilever to operatively engage the head of the second screw.

4. A device according to claim 1 wherein said screw holding housing is attached to said base member by breakaway means, and said housing can be broken away from said base member by a force of sufficient strength applied to said housing.

5. A device according to claim 4 wherein the associated member is adapted to receive a base plate, and wherein movement of said base plate relative to said associated member applies the force to said housing to breakaway said housing from said base member.

6. A device according to claim 5 wherein said screw holding housing comprises walls connected to said base member and supporting said cantilever, said walls converging upward in the direction of said cantilever.

7. A device according to claim 1 wherein the associated member is the retainer for the base plate of a ski binding.

8. A device according to claim 6 wherein said housing is a perforate mesh.

9. A device according to claim 4 wherein said device is fabricated from plastic.

10. Assembly for retaining screws in a ski binding apparatus, said assembly comprising:
 a first member having at least one screw receiving opening for attaching the first member to a ski;
 a second member to be attached to said first member, the second member having at least one opening for receiving the shank of a screw and being located for being aligned with the screw receiving opening of the first member when the first and second member are in an attaching position; and
 a cantilever device connected to said second member and overlapping the one opening of said second member when said first and second members are in attaching position, said cantilever device having an opening smaller than the head of a screw in said members but being large enough to admit a screw driver to engage the head of the screw.

11. An assembly according to claim 10 wherein said first member is a retainer for a base plate and said second member includes guide means for said base member.

* * * * *